US012661830B2

(12) United States Patent
Yano et al.

(10) Patent No.: US 12,661,830 B2
(45) Date of Patent: Jun. 23, 2026

(54) PRODUCTION APPARATUS FOR PRODUCING A FIBER-REINFORCED RESIN AND A PRODUCTION METHOD FOR PRODUCING A FIBER-REINFORCED RESIN

(71) Applicant: MITSUI CHEMICALS, INC., Tokyo (JP)

(72) Inventors: Masahiro Yano, Nagoya (JP); Atsushi Miyata, Urayasu (JP)

(73) Assignee: MITSUI CHEMICALS, INC., Tokyo (JP)

( * ) Notice: Subject to any disclaimer, the term of this patent is extended or adjusted under 35 U.S.C. 154(b) by 408 days.

(21) Appl. No.: 18/552,221

(22) PCT Filed: Mar. 14, 2022

(86) PCT No.: PCT/JP2022/011391
§ 371 (c)(1),
(2) Date: Sep. 25, 2023

(87) PCT Pub. No.: WO2022/202449
PCT Pub. Date: Sep. 29, 2022

(65) Prior Publication Data
US 2024/0173895 A1 May 30, 2024

(30) Foreign Application Priority Data

Mar. 26, 2021 (JP) ................................. 2021-053388

(51) Int. Cl.
*B29C 65/50* (2006.01)
*B29B 15/12* (2006.01)
(Continued)

(52) U.S. Cl.
CPC ............ *B29B 15/122* (2013.01); *B29C 65/50* (2013.01); *B29C 65/74* (2013.01); *B29C 66/69* (2013.01);
(Continued)

(58) Field of Classification Search
CPC ......... B05C 1/12; B29B 15/122; B29C 65/18; B29C 65/48; B29C 65/481;
(Continued)

(56) References Cited

U.S. PATENT DOCUMENTS

| 209,927 | A | 11/1878 | Shackleton |
| 621,575 | A | 3/1899 | Kip |

(Continued)

FOREIGN PATENT DOCUMENTS

| EP | 0989218 A1 | 3/2000 |
| JP | H0411052 A | 1/1992 |

(Continued)

*Primary Examiner* — Michael A Tolin
(74) *Attorney, Agent, or Firm* — BUCHANAN INGERSOLL & ROONEY PC

(57) ABSTRACT

A device for manufacturing a fiber-reinforced resin having an array of reinforcing fibers oriented in one direction, the device making it possible, with a comparatively simple configuration, to connect earlier and later reinforcing fibers to each other when switching the reinforcing fibers, is provided. The device having an array of reinforcing fibers oriented in one direction according to the present invention comprises: an impregnation unit that impregnates reinforcing fibers with a resin; and a switching device that, when the reinforcing fibers to be impregnated are changed to new fibers, connects the newly fed reinforcing fibers to the previously fed reinforcing fibers. When switching the reinforcing fibers, the device connects the new reinforcing fiber to the preceding reinforcing fiber by forming a bonded body in which the preceding reinforcing fibers and the new reinforcing fibers are bonded by fusing a melted second resin in a form of a thin film.

11 Claims, 10 Drawing Sheets

(51) Int. Cl.

| | |
|---|---|
| *B29C 65/00* | (2006.01) |
| *B29C 65/74* | (2006.01) |
| *B29C 70/20* | (2006.01) |
| *B29C 70/50* | (2006.01) |
| *B65H 69/02* | (2006.01) |
| *B29K 101/12* | (2006.01) |
| *B29K 307/04* | (2006.01) |

(52) U.S. Cl.
CPC ............ *B29C 66/853* (2013.01); *B29C 70/20* (2013.01); *B29C 70/504* (2013.01); *B65H 69/02* (2013.01); *B29K 2101/12* (2013.01); *B29K 2307/04* (2013.01)

(58) Field of Classification Search
CPC ... B29C 65/4815; B29C 65/486; B29C 65/50; B29C 65/5057; B29C 65/5092; B29C 65/74; B29C 65/745; B29C 65/7802; B29C 65/7832; B29C 66/1122; B29C 66/43; B29C 66/69; B29C 66/721; B29C 66/72141; B29C 66/832; B29C 66/8322; B29C 66/83221; B29C 66/8341; B29C 66/83411; B29C 66/83413; B29C 66/8362; B29C 66/853; B29C 70/20; B29C 70/50; B29C 70/504; B29C 70/523; B29C 70/54; B65H 69/02; B65H 69/06; B65H 69/08; B65H 69/085; B65H 2701/31; B65H 2701/312; B65H 2701/313; B65H 2701/314; B65H 2701/37; B65H 2701/38
See application file for complete search history.

(56) References Cited

U.S. PATENT DOCUMENTS

| | | | |
|---|---|---|---|
| 649,920 | A | 5/1900 | Ellis |
| 916,596 | A | 3/1909 | Rhoades |
| 1,145,124 | A | 7/1915 | Cutting |
| 1,294,482 | A | 2/1919 | Kremers |
| 1,444,070 | A | 2/1923 | Hall |
| 1,776,912 | A | 9/1930 | Klein |
| 2,142,025 | A | 12/1938 | Hall |
| 3,779,789 | A | 12/1973 | Park |
| 3,818,082 | A | 6/1974 | Burns et al. |
| 3,908,247 | A | 9/1975 | Murphy |
| 4,428,992 | A * | 1/1984 | Street ..................... B65H 69/02 |
| | | | 57/22 |
| 4,760,628 | A | 8/1988 | Kaufmann et al. |
| 4,773,137 | A | 9/1988 | Joos |
| 5,266,139 | A * | 11/1993 | Yokota ................. B29C 70/521 |
| | | | 156/169 |
| 6,425,969 | B1 | 7/2002 | Aker |
| 6,585,842 | B1 | 7/2003 | Bompard et al. |
| 2007/0044896 | A1* | 3/2007 | Tingley ................. B65H 69/00 |
| | | | 156/580 |
| 2008/0318020 | A1* | 12/2008 | Barnaud ................. C03C 27/10 |
| | | | 428/221 |
| 2013/0074663 | A1 | 3/2013 | Pedigo et al. |
| 2013/0118633 | A1 | 5/2013 | Studer et al. |
| 2014/0150922 | A1 | 6/2014 | Lecostaouec et al. |
| 2014/0346270 | A1* | 11/2014 | Tanigawa ............ B29C 53/8016 |
| | | | 242/560 |
| 2017/0252988 | A1* | 9/2017 | Tashiro ................. B29C 70/521 |
| 2019/0135576 | A1* | 5/2019 | Syuto ..................... B65H 69/08 |
| 2023/0241847 | A1 | 8/2023 | Kuniya |

FOREIGN PATENT DOCUMENTS

| | | | |
|---|---|---|---|
| JP | H0780836 A | | 3/1995 |
| JP | 2001525749 A | | 12/2001 |
| JP | 2006052043 A | | 2/2006 |
| JP | 2008143087 A | * | 6/2008 |
| JP | 2009066917 A | | 4/2009 |
| JP | 2011094244 A | | 5/2011 |
| JP | 2014034737 A | | 2/2014 |

* cited by examiner

PRODUCTION APPARATUS FOR PRODUCING A FIBER-REINFORCED RESIN AND A PRODUCTION METHOD FOR PRODUCING A FIBER-REINFORCED RESIN

TECHNICAL FIELD

The present invention relates to a production apparatus for producing a fiber-reinforced resin and a production method for producing a fiber-reinforced resin.

BACKGROUND ART

A fiber-reinforced resin (hereinafter, simply referred to as "Uni-Direction (UD) sheet") is known, which includes a plurality of reinforcing fibers arranged to be oriented in a single direction and a resin composition (matrix resin) impregnating the reinforcing fibers. This UD sheet is lighter in weight than a metal sheet, and nevertheless has a higher mechanical strength. Thus, the UD sheet has been studied for use as a reinforcing material or the like for covering the surface of a resin-molded article.

The UD sheet is usually produced by impregnating a reinforcing fiber fed out from a roll body with a resin material (see, for example, Patent Literature (hereinafter, referred to as "PTL") 1).

When the UD sheet is produced, a plurality of roll bodies are disposed in a creel, and reinforcing fibers are fed out from the roll bodies. When one of the roll bodies finishes feeding the reinforcing fibers, the reinforcing fibers impregnated with the resin are switched to the reinforcing fibers (hereinafter, also simply referred to as "new reinforcing fibers") which are newly fed out from another one of the roll bodies. At this time, the new reinforcing fibers are connected to the reinforcing fibers (hereinafter, also simply referred to as "preceding reinforcing fibers") from the roll body which finishes feeding, so that the new reinforcing fibers are also impregnated with the resin continuously.

As a method for connecting the reinforcing fibers, PTL 2 describes a method of tying a fibrous material that is characterized by unlikeliness for a knot to be untied even when the knot is pulled from opposite ends, and ease of untying the knot after the fibrous material is cut.

Further, PTL 3 describes a method of coupling reinforcing fibers to one another by entangling the fibers with each other by an air jet, and PTL 4 describes an apparatus that includes a splicer for performing the coupling method and that automatically replaces a bobbin for supplying reinforcing fibers.

CITATION LIST

Patent Literature

PTL 1

Japanese Unexamined Patent Application Publication (Translation of PCT Application) No. 2001-525749

PTL 2

Japanese Patent Application Laid-Open No. 2011-94244

PTL 3

Japanese Patent Application Laid-Open No. 2006-52043

PTL 4

Japanese Patent Application Laid-Open No. 2009-66917

SUMMARY OF INVENTION

Technical Problem

When the UD sheet is produced, the reinforcing fibers are moved to a resin impregnation section while being tensioned. Therefore, when the reinforcing fibers are switched, it is necessary to connect the reinforcing fibers to each other so as not to be untied even by the above-described tension. PTL 2 describes the method of tying reinforcing fibers, in which a knot is unlikely to be untied even when pulled from opposite ends (even when tension is applied). However, this tying method is complicated, and automation by a machine is difficult. Thus, the reinforcing fibers need to be connected manually by an operator. When the reinforcing fibers are manually connected, a production apparatus needs to be stopped for a long period of time at the time of connection, and thus it is difficult to improve the production efficiency of the UD sheet.

Meanwhile, PTL 3 and PTL 4 describe the method of connecting reinforcing fibers by entangling the fibers with each other by an air jet, and the automatic switching apparatus that uses the connecting method and that automatically switches the reinforcing fibers. However, the connection of the reinforcing fibers by the air jet is a relatively weak connection, and there is a possibility that the reinforcing fibers may be untied by tension.

Further, in production of the UD sheet, a plurality of reinforcing fibers fed out from a plurality of rolls are laterally arranged into a sheet shape, and the reinforcing fibers arranged in the sheet shape are impregnated with a resin. Therefore, an attempt to automate the switching of the reinforcing fibers by the method described in PTL 3 and PTL 4 simultaneously necessitates preparation of the same number of switching apparatuses as roll bodies that feed out the reinforcing fibers. It is thus not practical.

These issues can also arise when producing, as a fiber-reinforced resin, a pelletized resin composition (LFT) containing reinforcing fibers arranged to be oriented in a single direction.

The present invention has been made in view of the above-described problems of the prior art, and an object of the present invention is to provide a production apparatus for producing a fiber-reinforced resin in which preceding and following reinforcing fibers can be connected at the time of switching of the reinforcing fibers, and in which reinforcing fibers are arranged to be oriented in a single direction, and a production method for producing the fiber-reinforced resin using the apparatus.

Solution to Problem

A production apparatus for producing a fiber-reinforced resin in which a reinforcing fiber is arranged to be oriented in a single direction according to one embodiment of the present invention for solving the above problem includes: an impregnation section that impregnates the reinforcing fiber with a first resin; and a switching apparatus that switches the reinforcing fiber from a preceding reinforcing fiber to a new reinforcing fiber at an upstream side of the impregnation section. When switching the reinforcing fiber, the switching apparatus connects the new reinforcing fiber to the preceding reinforcing fiber by forming a bonded body in which the preceding reinforcing fiber and the new reinforcing fiber are bonded by fusing a melted second resin in a form of a thin film.

Further, a production method for producing a fiber-reinforced resin in which a reinforcing fiber is arranged to be oriented in a single direction according to another embodiment of the present invention for solving the above problem includes producing the fiber-reinforced resin while connecting the reinforcing fiber to one another by using a production apparatus for producing the fiber-reinforced resin.

Advantageous Effects of Invention

According to the present invention, a production apparatus for producing a fiber-reinforced resin in which the reinforcing fibers are arranged to be oriented in a single direction, the production apparatus being capable of connecting preceding and following reinforcing fibers at the time of switching of the reinforcing fibers with a relatively simple configuration, and, a production method for producing the fiber-reinforced resin using the apparatus are provided.

DESCRIPTION OF EMBODIMENTS

Embodiment 1

Figure 1:
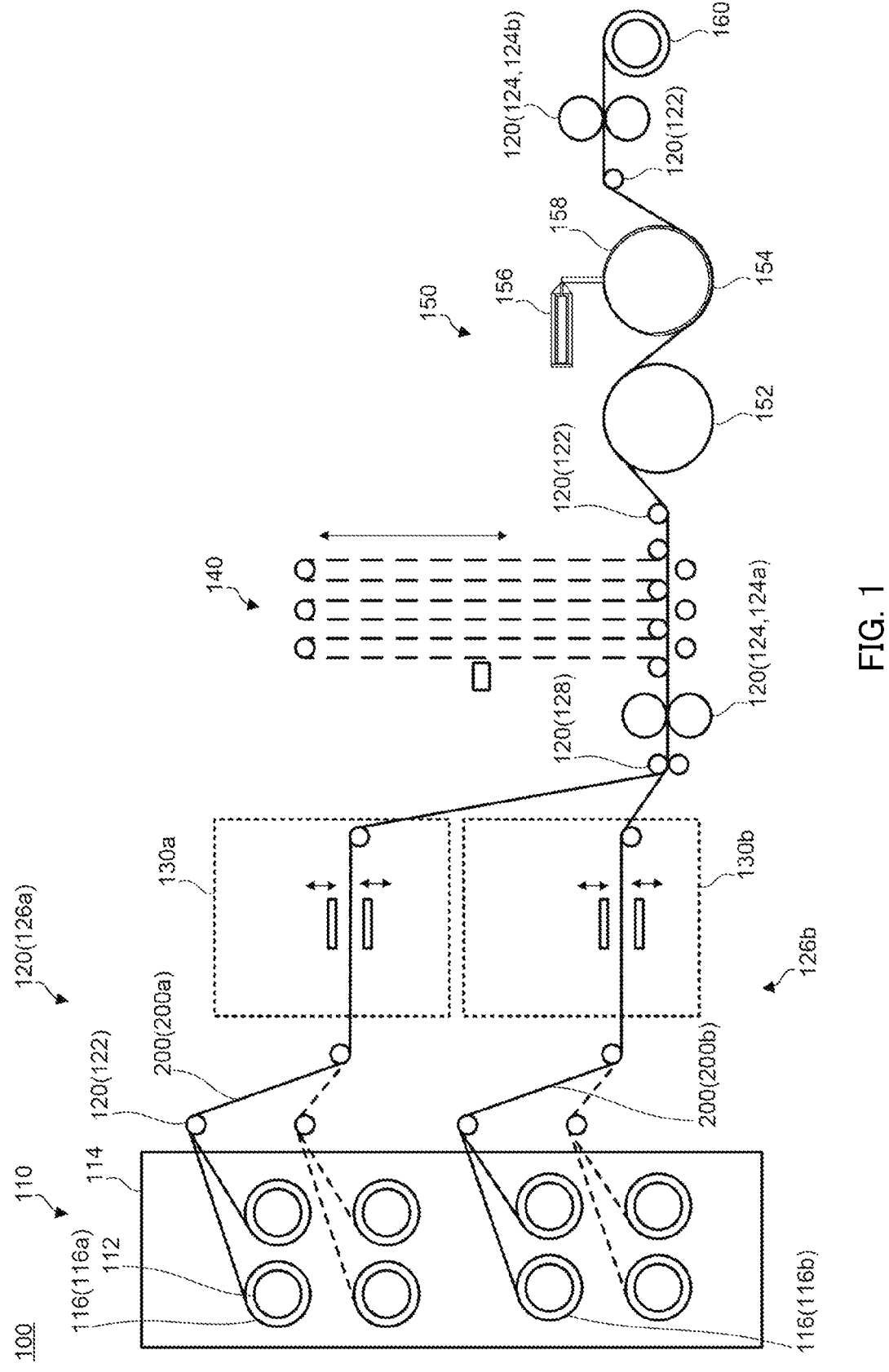
FIG. 1 schematically illustrates an exemplary configuration of a production apparatus for producing a fiber-reinforced resin in which reinforcing fibers are arranged to be oriented in a single direction according to one embodiment of the present invention.

FIG. 1 schematically illustrates an exemplary configuration of a production apparatus for producing a fiber-reinforced resin in which reinforcing fibers are arranged to be oriented in a single direction according to one embodiment of the present invention. FIG. 1 schematically illustrates an exemplary configuration of the production apparatus for producing a UD sheet as the fiber-reinforced resin.

Production apparatus 100 for producing the fiber-reinforced resin in which the reinforcing fibers are arranged to be oriented in a single direction includes fiber feeding section 110, guide path 120, switching apparatus 130a and switching apparatus 130b, accumulator 140, impregnation section 150, and winding section 160.

Fiber feeding section 110 supplies the reinforcing fibers that are to be impregnated with resin in impregnation section 150 to form the fiber-reinforced resin. In the present embodiment, fiber feeding section 110 is creel 114 in which a plurality of spindles 112 are disposed, and bobbins 116 around which reinforcing fibers 200 are wound are rotatably installed respectively on spindles 112.

In the present embodiment, each of reinforcing fibers 200 is a carbon fiber. However, reinforcing fiber 200 may be any fiber used for the fiber-reinforced resin, such as a glass fiber and aramid fiber.

Guide path 120 guides reinforcing fibers 200 supplied from fiber feeding section 110 to the components of switching apparatus 130, accumulator 140, impregnation section 150, and winding section 160 in this order. Guide path 120 includes a plurality of guide rolls 122, and, feeders 124 each of which is composed of two rolls opposed to each other across reinforcing fiber 200. The two rolls constituting feeder 124 rotate in opposite directions and in such a manner as to nip the reinforcing fiber, thereby moving reinforcing fiber 200 on a movement path formed by guide rolls 122.

Reinforcing fiber 200 is continuously fed out from each of bobbins 116 and moved by feeders 124. Thus, reinforcing fibers 200 continue to move on guide path 120 without interrupted.

At this time, feeders 124 apply a predetermined tension to reinforcing fibers 200. Due to the tension, the reinforcing fibers are linearly oriented in the moving direction. By impregnating the reinforcing fibers in the aforementioned state with the resin at impregnation section 150, the UD sheet is produced which includes a plurality of reinforcing fibers 200 arranged to be oriented in a single direction and a matrix resin impregnating reinforcing fibers 200.

In the present embodiment, guide path 120 includes two feeders 124a and 124b. Feeder 124a is disposed on the downstream side of switching apparatus 130 and on the upstream side of accumulator 140 in the moving direction of reinforcing fibers 200, and adjusts the moving speed of reinforcing fibers 200 until the reinforcing fibers pass through switching apparatus 130 after fed out from fiber feeding section 110. Feeder 124b is disposed on the downstream side of impregnation section 150 and on the upstream side of winding section 160 in the moving direction of reinforcing fibers 200, and adjusts the moving speed of reinforcing fibers 200 passing through impregnation section 150. The moving speed of reinforcing fibers 200 by feeder 124b defines the production speed of the fiber-reinforced resin produced by production apparatus 100.

In addition, in the present embodiment, guide path 120 includes a plurality of holding sections 126a and 126b that, at different positions, hold reinforcing fibers 200a and reinforcing fibers 200b respectively fed out from bobbins 116a and bobbins 116b different from bobbin 116a. Further, guide path 120 includes uniting section 128 for uniting reinforcing fibers 200a and reinforcing fibers 200b held by holding section 126a and holding section 126b, respectively.

Guide path 120 guides reinforcing fibers 200 united at uniting section 128 to accumulator 140 and impregnation section 150.

Figure 2:
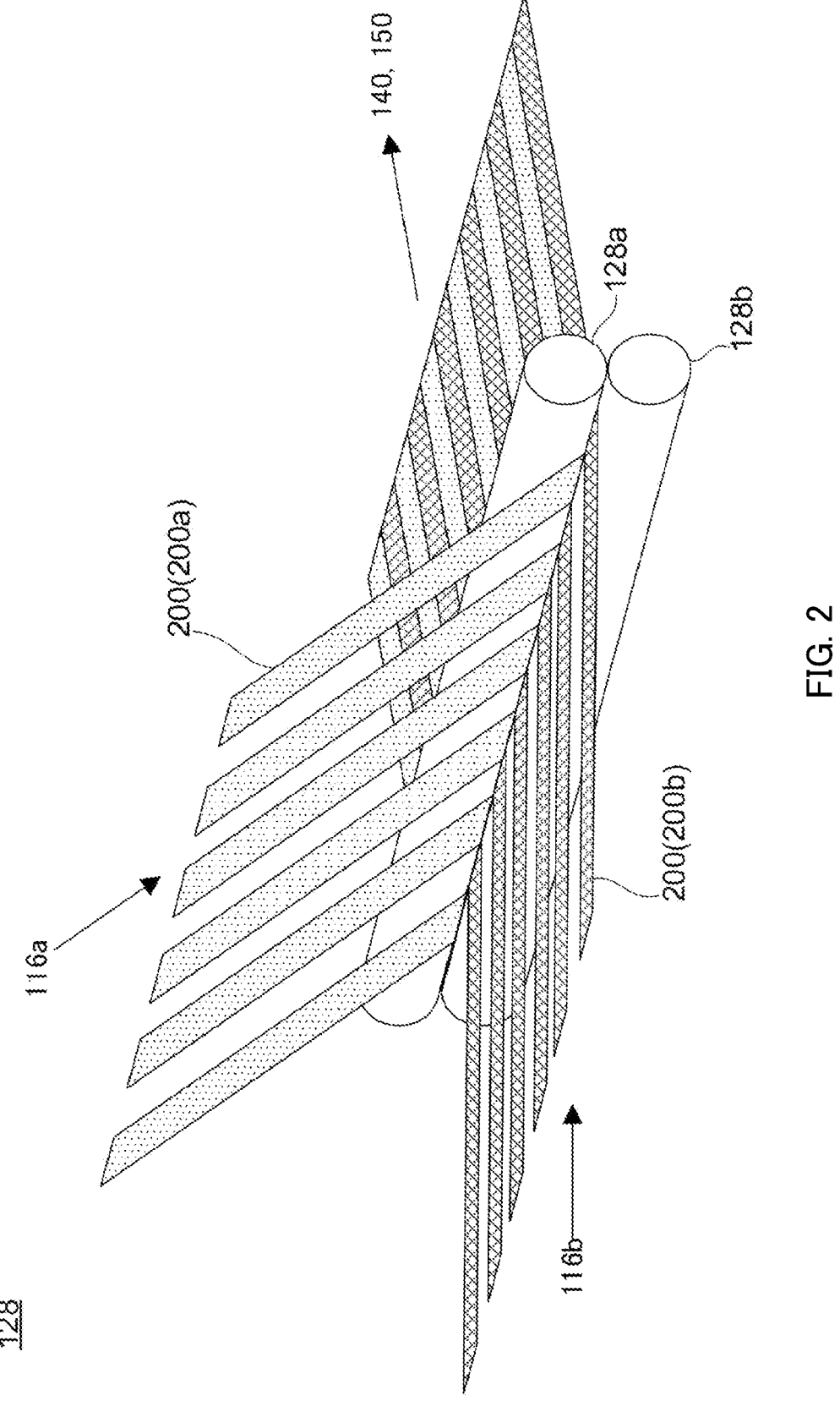
FIG. 2 schematically illustrates a state in which the reinforcing fibers are united at a uniting section.

FIG. 2 schematically illustrates a state in which reinforcing fibers 200a and reinforcing fibers 200b are united at uniting section 128. In the present embodiment, holding section 126a introduces, into uniting section 128, a plurality of reinforcing fibers 200a fed out from a plurality of bobbins 116a (six reinforcing fibers 200a fed out from six bobbins 116a in FIG. 2). Further, holding section 126b introduces, into uniting section 128, a plurality of reinforcing fibers 200b fed out from a plurality of bobbins 116b (six reinforcing fibers 200b fed out from six bobbins 116b in FIG. 2). In FIG. 2, reinforcing fibers 200 fed out from one bobbins 116 are collectively described as a single reinforcing fiber, but actually, each single reinforcing fiber 200 is a bundle (tow) of single fibers in which a plurality of single fibers are assembled and bound together by a binding member. In the present specification, for ease of understanding, a single tow is represented as single reinforcing fiber 200.

Each of holding section 126a and holding section 126b holds the plurality of reinforcing fibers 200 such that the reinforcing fibers are spaced from one another. Then, in uniting section 128, one of reinforcing fibers 200b held by holding section 126b is disposed in a gap between reinforcing fibers 200a held by holding section 126a. Then, uniting section 128 alternately disposes reinforcing fibers 200a held by holding section 126a and reinforcing fibers 200b held by holding section 126b, and pressurizes reinforcing fibers 200 in the thickness direction by the pair of rolls 128a and 128b to arrange and unite the reinforcing fibers into a sheet shape. As a result, the plurality of reinforcing fibers 200 fed out from the plurality of bobbins 116 can be arranged in a planar shape (sheet shape) without any gap. At this time, by disposing the end portions of adjacent reinforcing fibers 200 such that the end portions slightly overlap one another, the gaps between reinforcing fibers 200 may be more unlikely to occur. It is also possible to more evenly dispose the plurality of reinforcing fibers 200 fed out from the plurality of bobbins 116, and to suppress variations in physical properties of the UD sheet that could be caused due to uneven arrangement of the fibers in the produced UD sheet that is caused due to interference between the fibers during fiber opening.

Switching apparatus 130a and switching apparatus 130b are disposed on the respective holding sections, and switch the reinforcing fibers held by the respective holding sections from the preceding reinforcing fibers to the new reinforcing fibers.

The switching of reinforcing fibers 200 by switching apparatus 130a and switching apparatus 130b is performed when the remaining amount of reinforcing fibers 200a that can be fed out from bobbins 116a is small. Whether or not the remaining amount of reinforcing fibers 200a is small may be determined based on the amount of reinforcing fibers 200a having been fed out from bobbins 116a, or may be determined by measuring the amount of reinforcing fibers 200a currently wound on bobbins 116a (e.g., measuring the thickness or the like of the reinforcing fiber currently wound), or by reading, from fed reinforcing fibers 200a, a mark that is attached to reinforcing fibers 200a in advance and indicates that the remaining amount is small.

FIGS. 3A to 3D schematically illustrate a state in which switching apparatus 130a according to the present embodiment switches preceding reinforcing fibers 210 held by holding section 126a to new reinforcing fibers 220.

Figure 3A:
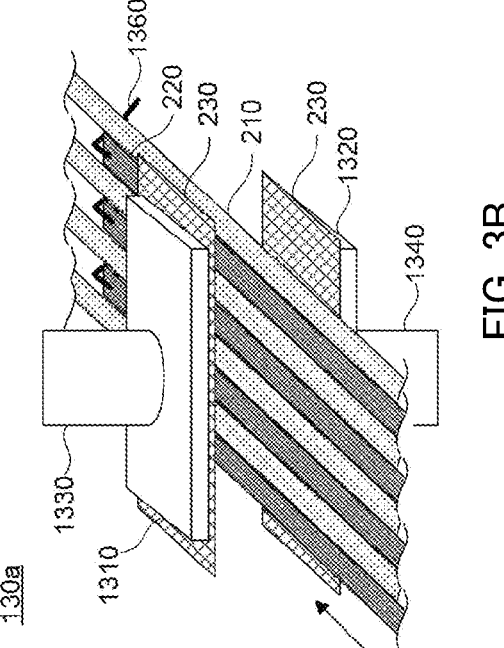
FIGS. 3A to 3D schematically illustrate a state in which a switching apparatus switches the reinforcing fibers held by a holding section to new reinforcing fibers.

FIG. 3A schematically illustrates switching apparatus 130a prior to switching. Switching apparatus 130a includes pressurization head 1310 and pedestal portion 1320 disposed at positions opposed to each other such that the moving reinforcing fibers are interposed between the pressurization head and the pedestal portion. Pressurization head 1310 is heated by a heating section (not illustrated) and moves in a direction toward and away from pedestal portion 1320 by cylinder 1330 (vertical direction in the figures). Pedestal portion 1320 is heated by a heating section (not illustrated) and moves in a direction toward and away from pressurization head 1310 by cylinder 1340 (vertical direction in the figures). Note that pedestal portion 1320 does not have to be moved in the vertical direction by cylinder 1340, and a configuration may be adopted in which reinforcing fibers 200 are pressed against pedestal portion 1320 by the vertical movement of pressurization head 1310.

Figure 3B:
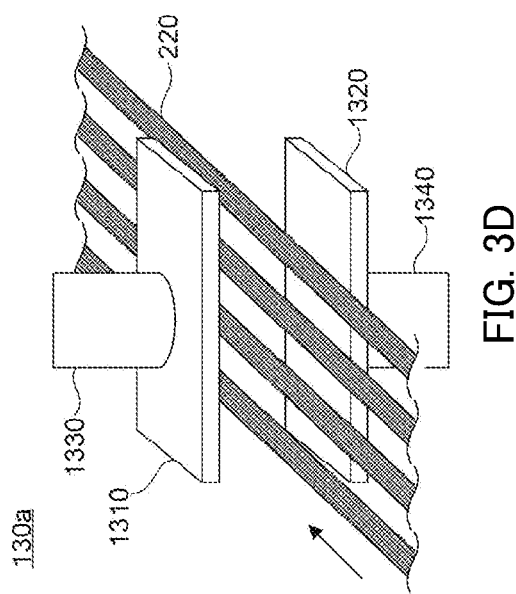
Figure 3C:
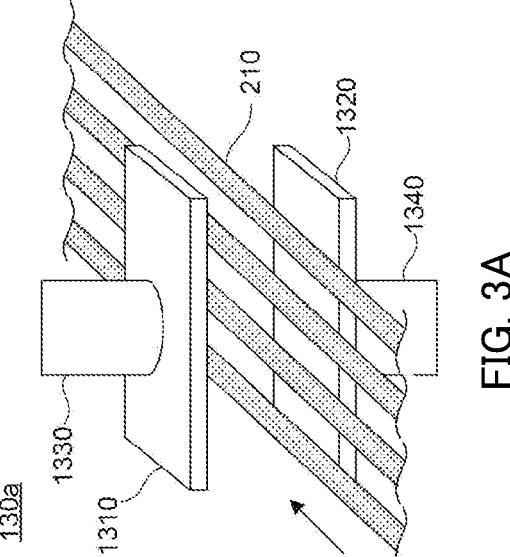

FIGS. 3B and 3C schematically illustrate switching apparatus 130a at a time when the reinforcing fibers to be impregnated with resin are switched to new reinforcing fibers. FIG. 3B illustrates the operation of switching apparatus 130a at a time when the remaining amount of reinforcing fibers 200a (preceding reinforcing fibers 210) that can be fed out from bobbins 116a is small. In FIG. 3B, gripping section 1360 grips the end portions of reinforcing fibers 200a (new reinforcing fibers 220) wound around those bobbins 116a which are not feeding out the reinforcing fibers, and moves these reinforcing fibers through gaps between moving preceding reinforcing fibers 210 spaced from one another.

At this time, preceding reinforcing fibers 210 continue to pass between pressurization head 1310 and pedestal portion 1320. Therefore, preceding reinforcing fibers 210 and new reinforcing fibers 220 move between pressurization head 1310 and pedestal portion 1320 while temporarily arranged in a planar shape (sheet shape) without any gap.

At the same time, resin film 230, which is a second resin in the form of a thin film, is supplied from a supply section (not illustrated) to each of the surfaces of pressurization head 1310 and pedestal portion 1320 facing each other. Although the resin film is described as an example in the present specification, the resin film may be any resin in the form of a thin film as long as it can be fused to preceding reinforcing fibers 210 and new reinforcing fibers 220 by heating and pressurization, and may be a resin having a larger thickness such as a sheet. Because of the use of the second resin in the form of a thin film which melts by heating or the like, it is possible to cool and solidify the second resin after fusion so as to prevent the second resin from contaminating other components of production apparatus 100.

In this state, pressurization head 1310 and pedestal portion 1320 are heated by the heating sections to melt resin films 230. At the same time, cylinder 1330 moves pressurization head 1310 in the direction toward pedestal portion 1320, and cylinder 1340 moves pedestal portion 1320 in the direction toward pressurization head 1310. As a result, molten resin films 230 make contact respectively with both of preceding reinforcing fibers 210 and new reinforcing fibers 220, are disposed to sandwich the reinforcing fibers, pressurized, and fused to preceding reinforcing fibers 210 and new reinforcing fibers 220. In this way, pressurization head 1310 and pedestal portion 1320 act as a pressing section in the present embodiment.

Note that the configuration of the pressing section is not limited to pressurization head 1310 and pedestal portion 1320 described above, and for example, a configuration may be adopted in which molten resin films 230 are brought into contact with preceding reinforcing fibers 210 and new reinforcing fibers 220 by rotary rolls and the resin films are pressurized by these rolls.

Figure 4:
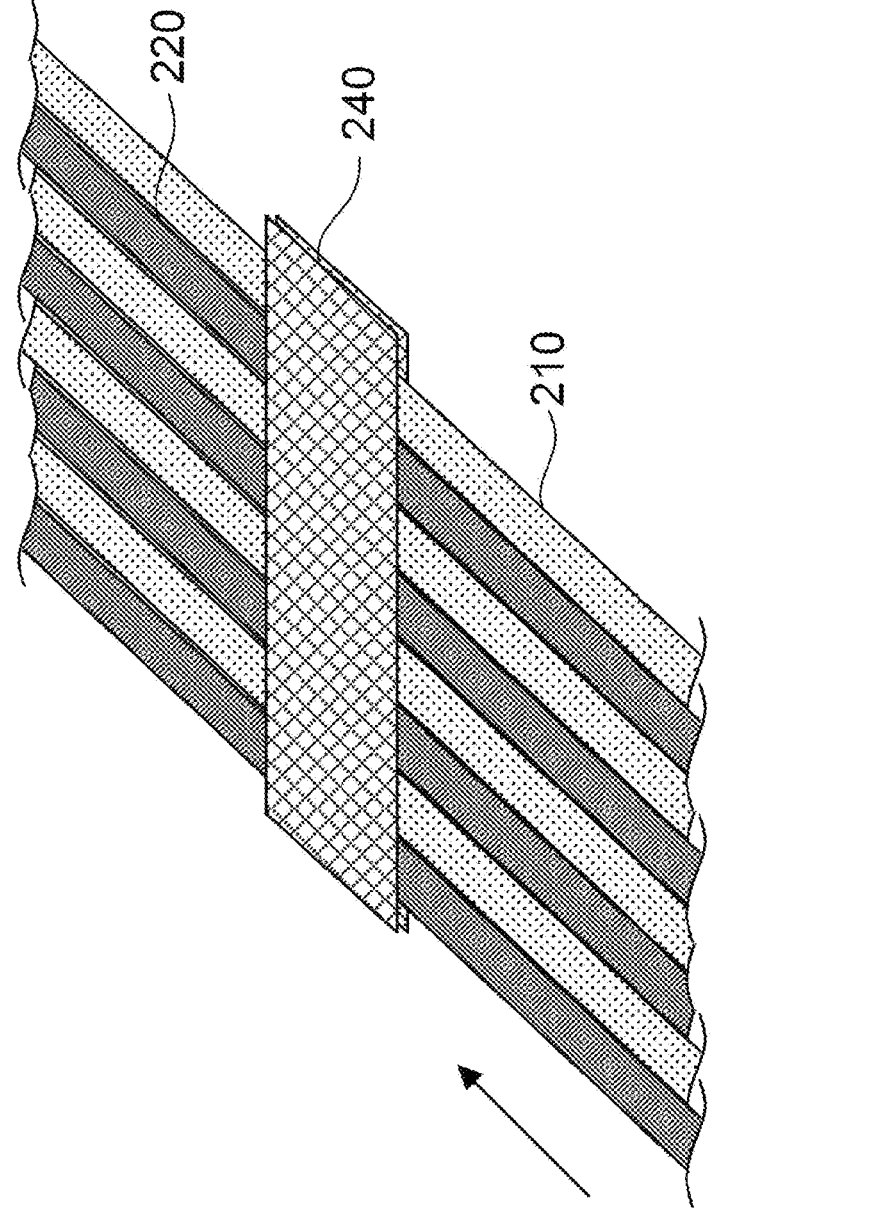
FIG. 4 schematically illustrates a bonded body formed by fusing resin films to preceding reinforcing fibers and new reinforcing fibers arranged in a planar shape.

In this way, as illustrated in FIG. 4, bonded body 240 is formed by fusing resin films 230 to preceding reinforcing fibers 210 and new reinforcing fibers 220 arranged in a planar shape. In bonded body 240, preceding reinforcing fibers 210 and new reinforcing fibers 220 are firmly connected to each other by fusion of resin films 230. Bonded body 240 may have such a strength that preceding reinforcing fibers 210 and new reinforcing fibers 220 are not easily untied even by a tension applied to reinforcing fibers 200 by production apparatus 100. For example, since the production apparatus usually applies a tension of the order of 1,000 cN to reinforcing fibers 200, bonded body 240 may have a strength preventing the bonded body from being untied when the tension of 1,000 cN is applied to the bonded body in the length direction of the reinforcing fibers.

In view of the above, the thickness of each of resin films 230 is preferably 1 μm or more and 1 mm or less, and more preferably 25 μm or more and 150 μm or less.

In addition, in view of the above, the length of resin film 230 in the moving direction of reinforcing fiber 200 is preferably equal to or greater than 1 cm, and more preferably equal to or greater than 5 cm. In addition, from the viewpoint of shortening the length of bonded body 240 to be removed from the produced UD sheet, the length of resin film 230 is preferably equal to or less than 200 cm, and more preferably equal to or less than 100 cm.

In addition, from the viewpoint of fusing resin films 230 to all reinforcing fibers 200 moving in parallel, the width of each of resin films 230 in the direction perpendicular to the moving direction of reinforcing fibers 200 is preferably wider than the width of all reinforcing fibers 200 moving in parallel.

Resin film 230 may be a film made of the same kind of resin as the resin (first resin) impregnating reinforcing fibers 200 in impregnation section 150, or may be a film made of a different resin. It is preferable that, among these resins of the same kind and different kinds, the resin film be made of the same kind of resin having high affinity with the first resin that makes contact with reinforcing fibers 200 and bonded body 240 in impregnation section 150. In addition, from the viewpoint of suppressing deterioration in production efficiency and quality of the UD sheet that could be caused due to accumulation of the second resin softened in impregnation section 150, it is preferable that the resin forming the resin film be a resin having a glass-transition temperature higher than the heating temperature in impregnation section 150.

Figure 3D:
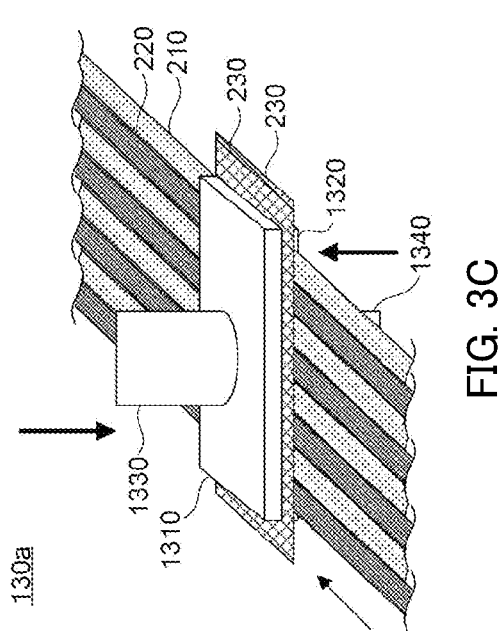

In this way, switching apparatus 130a connects preceding reinforcing fibers 210 and new reinforcing fibers 220 by forming bonded body 240. FIG. 3D schematically illustrates switching apparatus 130a after switching. After the formation of bonded body 240, preceding reinforcing fibers 210 are cut to stop the feeding of the preceding reinforcing fibers. Accordingly, only new reinforcing fibers 220 are fed out and sent to impregnation section 150. Since new reinforcing fibers 220 sent at this time are connected to preceding reinforcing fibers 210 by bonded body 240, it is possible to continuously produce the UD sheet while switching the reinforcing fibers, without stopping production apparatus 100.

The switching of the reinforcing fibers in one switching apparatus 130a has been described so far. In addition, the switching from the preceding reinforcing fibers to the new reinforcing fibers by forming the bonded body in the same manner is simultaneously performed also in the other switching apparatus 130b in the present embodiment. In addition, the new reinforcing fibers after the switching are arranged and united in a sheet shape at uniting section 128.

Figures 5A, 5B:
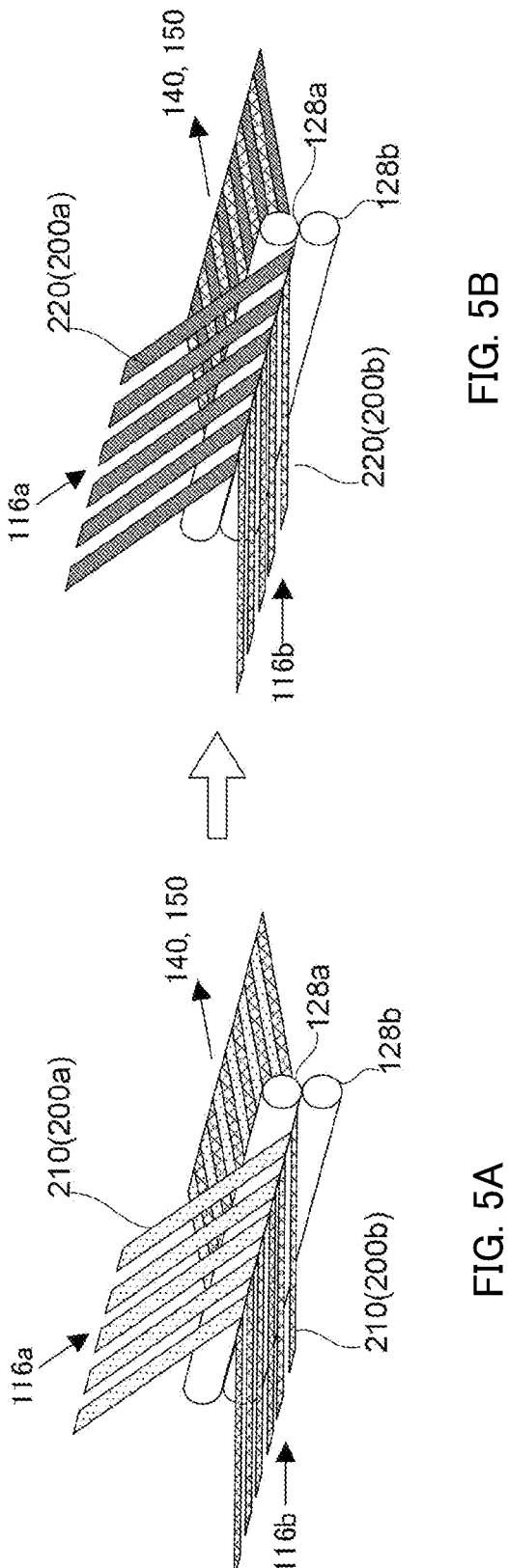
FIG. 5A schematically illustrates the uniting section before switching.
FIG. 5B schematically illustrates the uniting section after switching.

Meanwhile, in switching apparatuses 130, bonded body 240 is formed by disposing new reinforcing fibers 220 between adjacent reinforcing fibers of a plurality of moving preceding reinforcing fibers 210 spaced from one another. After the switching, new reinforcing fibers 220 are moved to positions corresponding to the gaps between the fibers of preceding reinforcing fiber 210. In the present embodiment, each of two switching apparatuses 130a and 130b exchanges the positions where preceding reinforcing fibers 210 move with the positions where new reinforcing fibers 220 move. Thus, as illustrated in FIG. 5A illustrating the uniting section before switching and FIG. 5B illustrating the uniting section after switching, in uniting section 128, the positions of reinforcing fibers 210 received from switching apparatus 130a (holding section 126a) and reinforcing fibers 220 received from switching apparatus 130b (holding section 126b) are changed such that the positions are exchanged before and after switching.

When switching apparatus 130 switches reinforcing fibers 200, production apparatus 100 may slow the moving speed of reinforcing fibers 200 until the reinforcing fibers pass switching apparatus 130 after being fed out from fiber feeding section 110, by using feeder 124a disposed on the downstream side of switching apparatus 130a and switching apparatus 130b and on the upstream side of accumulator 140. By reducing the moving speed of reinforcing fibers 200 in this range, resin films 230 can be more firmly fused by taking time, and the strength of bonded body 240 can be further increased.

At this time, accumulator 140 adjusts the length of the movement path of reinforcing fibers 200 to keep the moving speed of the reinforcing fibers at impregnation section 150 (the moving speed of the reinforcing fibers between accumulator 140 and winding section 160) at the same speed as in a case where the switching is not performed.

That is, accumulator 140 is configured to be capable of changing the length of the movement path of reinforcing fibers 200 to change the length (amount) of reinforcing fibers 200 passing through accumulator 140. Further, when reinforcing fibers 200 are not switched, the movement path of reinforcing fibers 200 at accumulator 140 is lengthened to increase the length (amount) of reinforcing fibers 200 passing through accumulator 140, and when switching apparatus 130 switches reinforcing fibers 200, the length (amount) of reinforcing fibers 200 passing through accumulator 140 is reduced. Accordingly, even when the passing speed of reinforcing fibers 200 in switching apparatus 130 is reduced, the amount of reinforcing fibers 200 sent from accumulator 140 to impregnation section 150 can be kept constant. In other words, accumulator 140 accumulates reinforcing fibers 200 when reinforcing fibers 200 are not switched, and discharges accumulated reinforcing fibers 200 little by little when switching apparatus 130 switches reinforcing fibers 200. Accordingly, the amount of reinforcing fibers 200 sent from accumulator 140 to impregnation section 150 can be kept constant.

Impregnation section 150 opens reinforcing fibers 200 and impregnates reinforcing fibers 200 with resin.

Impregnation section 150 first moves reinforcing fibers 200 along the surface of fiber-opening roller 152, and abrades reinforcing fibers 200 against fiber-opening roller 152 to open reinforcing fibers 200. Next, opened reinforcing fibers 200 are guided to impregnation roller 154 and moved along the surface of impregnation roller 154. Molten resin 158 (first resin) extruded from extruder 156 is attached to and rotationally moves on the surface of impregnation roller 154, and reinforcing fibers 200 and the surface of impregnation roller 154 come into contact with each other, whereby resin 158 impregnates reinforcing fibers 200.

The method of fiber opening and impregnation of the resin is not limited to the above method. For example, reinforcing fibers 200 may be abraded against a plurality of fiber-opening rollers during fiber opening, or vibrations may be applied to reinforcing fibers 200 during fiber opening. In addition, a sizing agent for facilitating impregnation with resin 158 may be applied to reinforcing fibers 200 during fiber opening. Further, at the time of impregnation, reinforcing fibers 200 may be impregnated with a resin by a method such as immersing the reinforcing fibers in a bath of molten resin.

Meanwhile, in the produced UD sheet, bonded body 240, which is a connecting portion of reinforcing fibers 200, is a portion where another resin derived from resin films 230 is mixed or the ratio between reinforcing fibers 200 and the resin is changed. Therefore, the portion corresponding to bonded body 240 may be cut from the UD sheet and removed during the production or after the production.

In view of the above, production apparatus 100 may include a removal section that removes the portion where bonded body 240 is formed by fusing resin films 230 (portion including bonded body 240 and the first resin).

Figure 6:
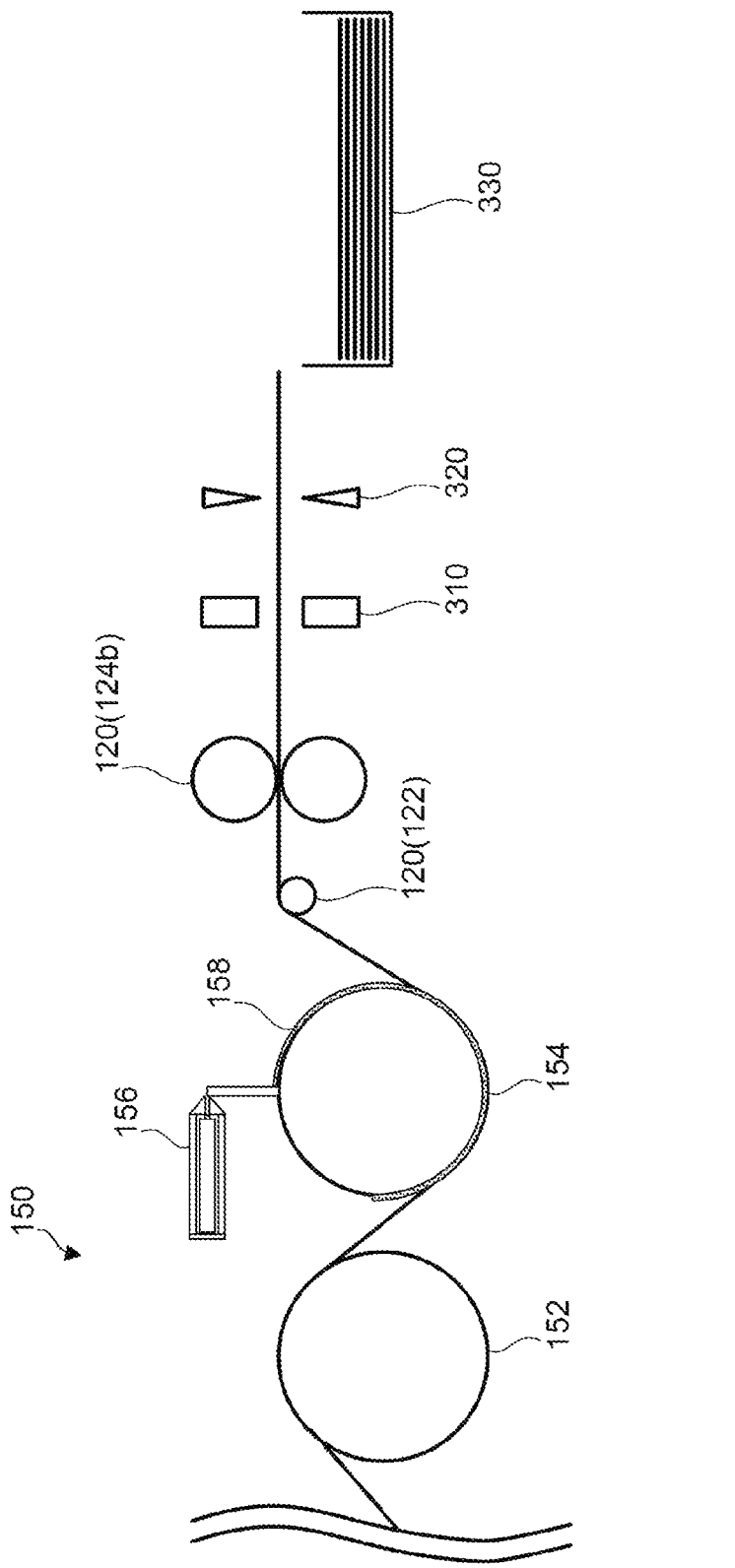
FIG. 6 schematically illustrates an exemplary configuration of the production apparatus for producing the fiber-reinforced resin, including a removal section that removes a portion where a composite is formed.

For example, as illustrated in FIG. 6, production apparatus 300 for producing the fiber-reinforced resin in which the reinforcing fibers are arranged to be oriented in a single direction may include, on the downstream side of impregnation section 150, thickness measurement section 310 for measuring the thickness of a composite formed by impregnating reinforcing fibers 200 with resin, and cutting section 320 for cutting the composite. Since the configuration of production apparatus 300 on the upstream side of impregnation section 150 can be the same as that of production apparatus 100 illustrated in FIG. 1, only the configuration on the downstream side of impregnation section 150 is illustrated in FIG. 6. The composite to be subjected to thickness measurement and cutting may be a UD sheet in which the impregnating resin is cooled and solidified, or may be a composite before being cooled and solidified.

Thickness measurement section 310 measures the thickness of the composite after impregnation with the resin. The portion where bonded body 240 is formed includes a larger amount of reinforcing fibers 200 than other portions, and/or the thickness of resin films 230 is added at this portion. Accordingly, the thickness of this portion of the composite is larger than the thickness of the other portions. Therefore, the portion where the thickness measured by thickness measurement section 310 is large can be determined as a portion of the composite where bonded body 240 is formed.

Cutting section 320 cuts the composite at positions before and after the portion where the thickness measured by thickness measurement section 310 is large and which is thus determined to be the portion where bonded body 240 is formed. As a result, the portion where bonded body 240 is formed can be removed from the composite.

Note that the leading end portions of new reinforcing fibers 220 gripped by gripping section 1360 do not form bonded body 240. Similarly, the rear end portions of preceding reinforcing fibers 210 do not form bonded body 240. As such, cutting section 320 may also remove, from the composite, these portions of new reinforcing fibers 220 or preceding reinforcing fibers 210 that do not form bonded body 240. For example, cutting section 320 may remove, from the composite, a portion of the composite that includes a portion corresponding to bonded body 240 and a portion that is shorter than the same length as bonded body 240 (preferably, shorter than half the length of bonded body 240) on each of the upstream side and on the downstream side along the moving direction of reinforcing fibers 200.

The UD sheet from which the above-described portion have been removed is collected as the UD sheet in a sheet shape in collection section 330. In the present embodiment, a plurality of UD sheets are stacked and collected in collection section 330, but may also be collected in the form of a roll.

Note that the method of removing the portion where bonded body 240 is formed is not limited to the above-described cutting, and the above-described portion may be removed by punching or the like, for example.

Further, the method of determining the above-described portion is not limited to the determining method based on the thickness of the composite. For example, removal may be performed after reinforcing fibers 200 of a predetermined length (length corresponding to one bobbin) is impregnated with resin, or may be performed based on a signal indicating that the reinforcing fibers have been connected in switching apparatus 130a and switching apparatus 130b.

Embodiment 2

Figure 7:
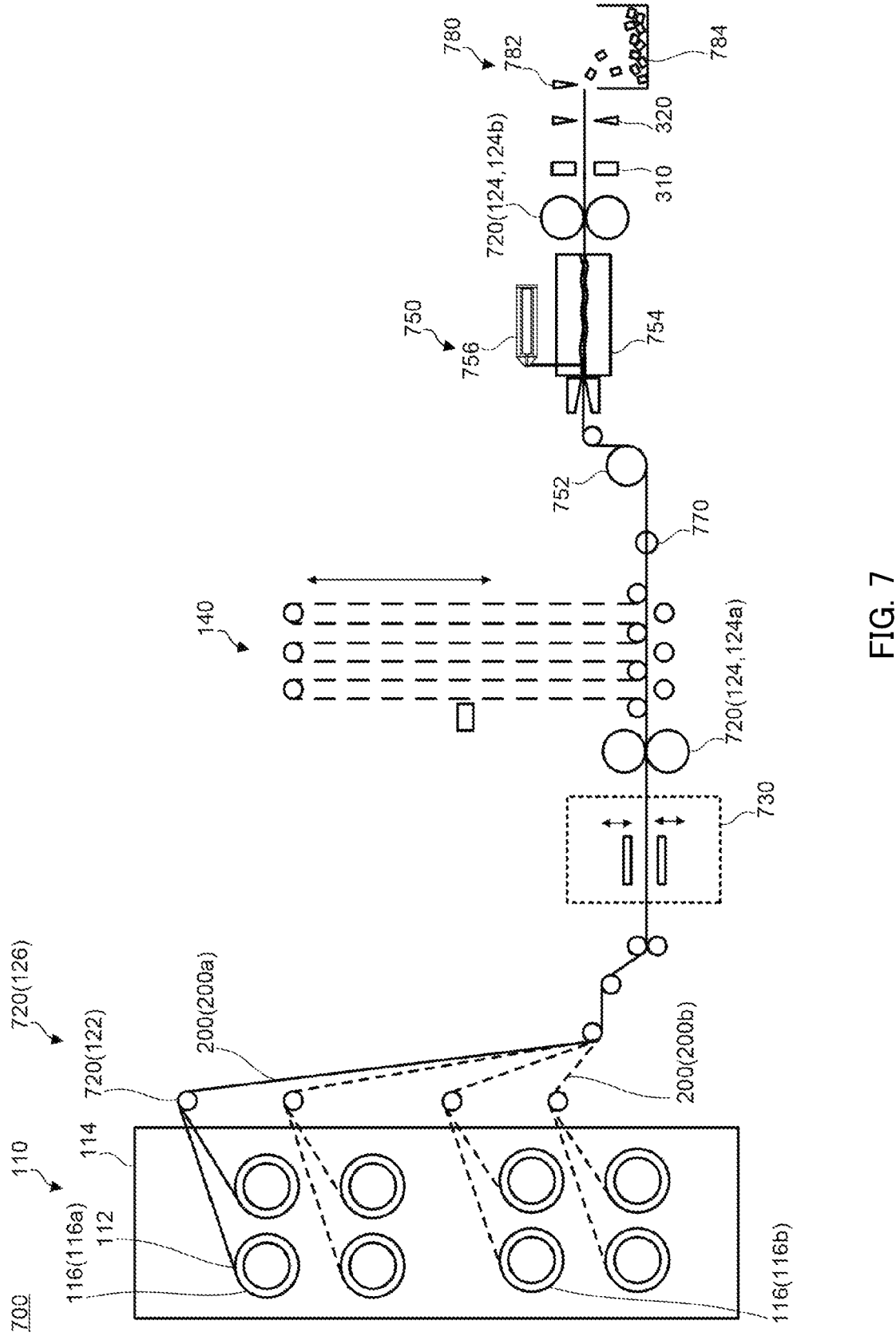
FIG. 7 schematically illustrates an exemplary configuration of a production apparatus for producing a fiber-reinforced resin in which reinforcing fibers are arranged to be oriented in a single direction according to another embodiment of the present invention.

FIG. 7 schematically illustrates an exemplary configuration of a production apparatus for producing a fiber-reinforced resin in which reinforcing fibers are arranged to be oriented in a single direction according to another embodiment of the present invention. FIG. 7 schematically illustrates an exemplary configuration of the production apparatus for producing, as the fiber-reinforced resin, a pelletized resin composition (Long Fiber Thermoplastics (LFT)) including the reinforcing fibers arranged to be oriented in a single direction.

Production apparatus 700 for producing the fiber-reinforced resin in which the reinforcing fibers are arranged to be oriented in a single direction includes fiber feeding section 110, guide path 720, switching apparatus 730, accumulator 140, dividing section 770, impregnation section 750, removal section (thickness measurement section 310 and cutting section 320), and collection section 780.

Regarding production apparatus 700 according to the present embodiment, in impregnation section 750, reinforcing fibers 200 are introduced respectively into individual die holes, and each of reinforcing fibers 200 is impregnated with the first resin. Then, a corresponding number of pellets (LFT) corresponding to the number of die holes that are formed by impregnating each of reinforcing fibers 200 with the first resin are obtained.

Therefore, in production apparatus 700, guide path 720 does not have a configuration in which the reinforcing fibers from different holding sections 126 are united at uniting section 128, and moving reinforcing fibers 200 spaced from one another are guided to impregnation section 750 while being kept spaced from one another (without arranging reinforcing fibers 200 in a planar shape having no gap). Therefore, switching apparatus 730 also forms a bonded body without arranging preceding reinforcing fibers 210 and new reinforcing fibers 220 in a planar shape even during switching of reinforcing fibers 200. Further, production apparatus 700 includes dividing section 770 that cuts the bonded body in the longitudinal direction (in the moving direction of reinforcing fibers 200) before the bonded body is introduced into impregnation section 750, to divide the bonded body for each reinforcing fiber 200. Further, in production apparatus 700, impregnation section 750 supplies the molten first resin to reinforcing fibers 200 (the bundles of reinforcing fibers in fact) passing through the insides of the die holes, and impregnates each of reinforcing fibers 200 with the first resin. Then, in the production apparatus, collection section 780 cuts, into pellets, a long composite obtained by impregnating reinforcing fibers 200 with the resin, and collects the pellets. Production apparatus 700 according to the present embodiment may have the same configuration as that of production apparatus 100 according to Embodiment 1 with respect to other configurations, and therefore, description of the same configurations will be omitted in the following.

In the present embodiment, guide path 720 guides reinforcing fibers 200 supplied from fiber feeding section 110 to component sections of switching apparatus 730, accumulator 140, dividing section 770, impregnation section 750, and winding section 160 in this order, while moving the reinforcing fibers spaced from one another. The configurations and operations of accumulator 140 and winding section 160 are the same as those of production apparatus 100 according to Embodiment 1.

FIGS. 8A to 8D illustrate a state in which switching apparatus 730 according to the present embodiment switches preceding reinforcing fibers 210 held by holding section 126 to new reinforcing fibers 220.

Figures 8A, 8B, 8C, 8D:
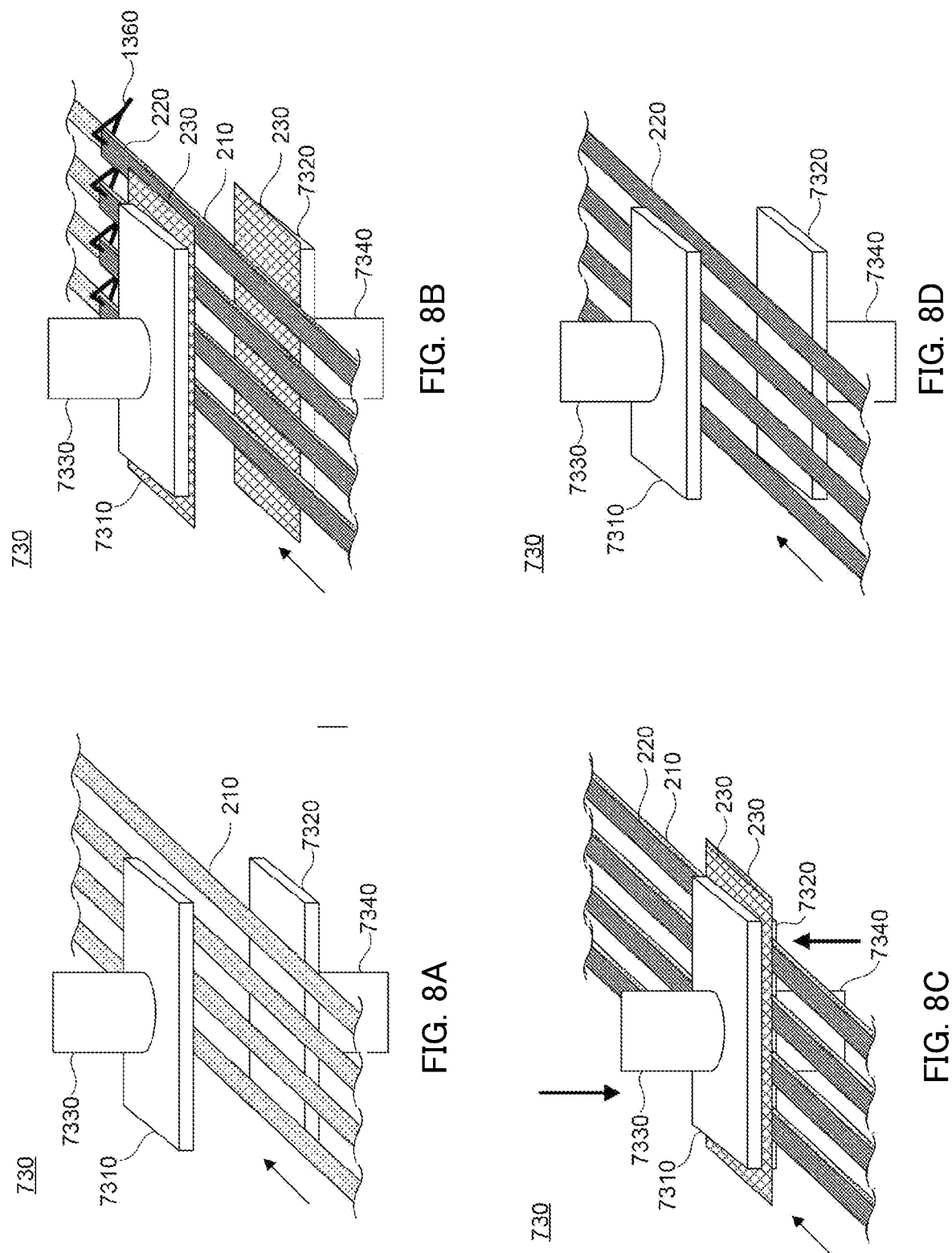
FIGS. 8A to 8D schematically illustrate a state in which the switching apparatus switches the reinforcing fibers held by a holding section to new reinforcing fibers.

FIG. 8A schematically illustrates switching apparatus 730 prior to switching. Switching apparatus 730 includes pressurization head 7310 that is vertically moved by cylinder 7330 and pedestal portion 7320 that is vertically moved by cylinder 7340, the pressurization head and the pedestal portion being disposed at positions opposed to each other such that moving reinforcing fibers are interposed between the pressurization head and the pedestal portion. The configurations and operations of pressurization head 7310 and pedestal portion 7320 are the same as those of switching apparatus 130 according to Embodiment 1.

FIGS. 8B and 8C schematically illustrate switching apparatus 730 at a time when the reinforcing fibers to be impregnated with resin are switched to the new reinforcing fibers. FIG. 8B illustrates the operation of switching apparatus 730 at a time when the remaining amount of reinforcing fibers 200a (preceding reinforcing fibers 210) that can be fed out from bobbins 116a is small. In FIG. 8B, gripping section 7360 grips the end portions of reinforcing fibers 200a (new reinforcing fibers 220) wound on bobbins 116a that are not feeding out the reinforcing fibers, and moves these reinforcing fibers to a position where these reinforcing fibers overlap vertically (in the pressing direction of pressurization head 7310 and pedestal portion 7320) with moving preceding reinforcing fibers 210 spaced from one another.

At this time, preceding reinforcing fibers 210 continue to pass between pressurization head 7310 and pedestal portion 7320. Therefore, preceding reinforcing fibers 210 and new reinforcing fibers 220 move between pressurization head 7310 and pedestal portion 7320 while temporarily arranged to overlap with each other.

Further, at the same time, resin film 230 is supplied from a supply section (not illustrated) to each of the surfaces of pressurization head 1310 and pedestal portion 1320 facing each other.

In this state, pressurization head 7310 and pedestal portion 7320 are heated by the heating section to melt resin films 230. At the same time, cylinder 7330 moves pressurization head 7310 in the direction toward pedestal portion 7320, and cylinder 7340 moves pedestal portion 7320 in the direction toward pressurization head 7310. As a result, molten resin films 230 make contact with preceding reinforcing fibers 210 and new reinforcing fibers 220, are disposed to sandwich the reinforcing fibers, pressurized, and fused to preceding reinforcing fibers 210 and new reinforcing fibers 220. In this way, pressurization head 7310 and pedestal portion 7320 act as a pressing section in the present embodiment.

Figure 9:
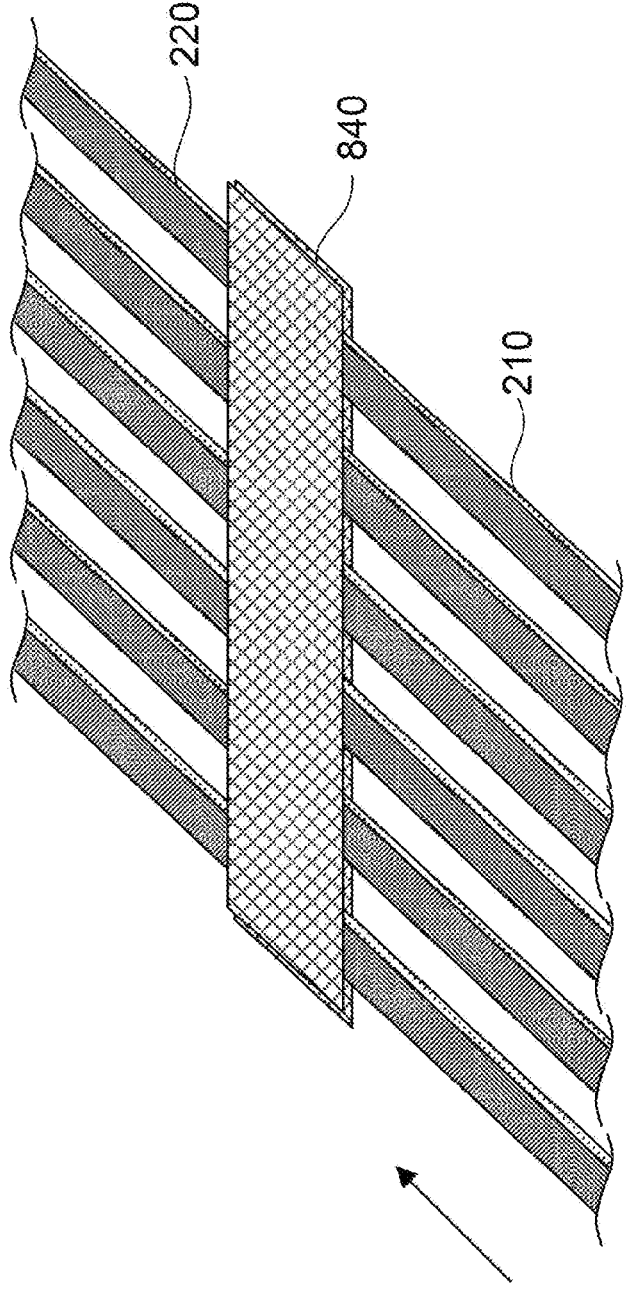
FIG. 9 schematically illustrates the bonded body formed by fusing resin films to preceding reinforcing fibers and new reinforcing fibers arranged in an overlapping manner.

In this way, as illustrated in FIG. 9, bonded body 840 is formed by fusing resin films 230 to preceding reinforcing fibers 210 and new reinforcing fibers 220 arranged to overlap with each other. As in Embodiment 1, in bonded body 840, preceding reinforcing fibers 210 and new reinforcing fibers 220 are firmly connected by fusion of resin films 230. Bonded body 840 may have such a strength that preceding reinforcing fibers 210 and new reinforcing fibers 220 are not easily untied even by a tension applied to reinforcing fibers 200 by production apparatus 100. For example, since the production apparatus usually applies a tension of the order of 1,000 cN to reinforcing fibers 200, bonded body 840 may have a strength preventing the bonded body from being untied when the tension of 1,000 cN is applied to the bonded body in the length direction of the reinforcing fibers.

Note that like Embodiment 1, the configuration of the pressing section, the kind of the resin films, and the like are not limited to those in the above description.

Figure 10:
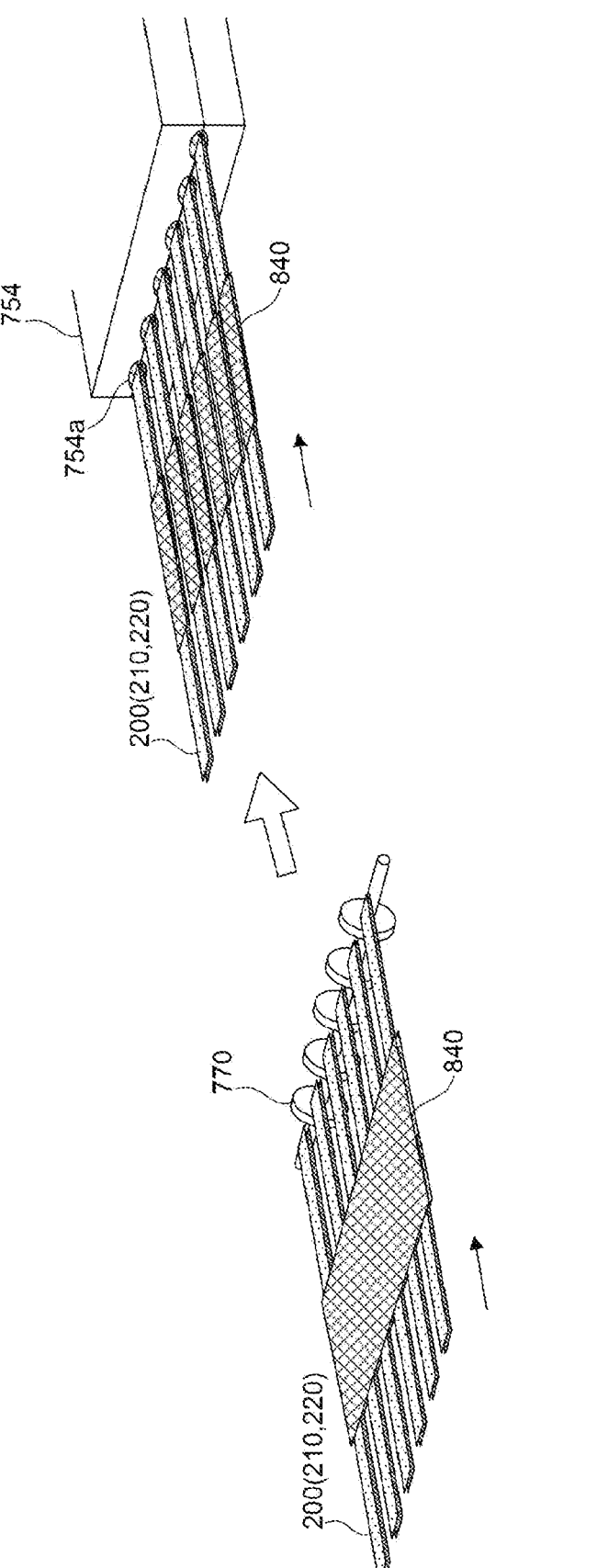
FIG. 10 schematically illustrates a state in which the reinforcing fibers on which the bonded body is formed are introduced into a cutting section and an impregnation section.

FIG. 10 schematically illustrates a state in which reinforcing fibers 200 on which bonded body 240 is formed are introduced into dividing section 770 and impregnation section 750.

Reinforcing fibers 200 having moved to dividing section 770 via switching apparatus 730 partly include bonded body 840 that is formed at the time of switching from preceding reinforcing fibers 210 to new reinforcing fibers 220 and that is formed in a sheet shape by fusion of resin films 230.

Dividing section 770 cuts, in the longitudinal direction, bonded body 240, which is formed in a sheet shape at a part of the reinforcing fibers by fusion of resin films 230, so as to divide bonded body 240 for each reinforcing fiber 200. Dividing section 770 may have a configuration similar to that of a known slitter that cuts a film in the moving direction.

Impregnation section 750 includes fiber-opening roller 752 and impregnation die 754. Impregnation die 754 includes a plurality of die holes 754a, all of which extend through impregnation die 754 in the moving direction of reinforcing fibers 200.

After reinforcing fibers 200 including bonded body 240 divided by dividing section 770 are opened by fiber-opening roller 752, guide path 720 introduces reinforcing fibers 200 respectively into different die holes 754a in impregnation section 750. Molten resin extruded from extruder 756 (first resin) is supplied to the inside of each of die holes 754a. Reinforcing fibers 200 make contact with the molten resin inside die hole 754a, and make contact with different wall surfaces of die hole 754a. Accordingly, penetration of the resin into the inside of the bundle of reinforcing fibers 200 is promoted. Thus, resin 158 impregnates reinforcing fibers 200.

Then, after subjected to cooling in a cooling tank, forming of the external shape, and/or the like, a long composite formed by impregnating the bundle of reinforcing fibers with the first resin can be obtained. As illustrated in FIG. 7, also in the present embodiment as in Embodiment 1, a portion where bonded body 240 is formed by fusion of resin films 230 (a portion including bonded body 240 and the first resin) may be removed by the removal section (thickness measurement section 310 and cutting section 320). Note that like Embodiment 1, the configuration of the removal section is not limited to the configuration including thickness measurement section 310 and cutting section 320.

Further, in the present embodiment, as illustrated in FIG. 7, collection section 780 includes pelletizing cutter 782 for cutting the long composite into pieces of a predetermined length, and collection container 784 that collects the cut pelletized composite. The cut pelletized composite (LFT) can thus be obtained. Note that production apparatus 700 may collect the long composite before pelletizing.

[Materials and the Like]

The material of the above reinforcing fibers is not particularly limited. For example, carbon fibers, glass fibers, aramid fibers, alumina fibers, silicon carbide fibers, boron fibers, metal fibers, and the like can be used as the reinforcing fibers.

From the viewpoint of sufficiently enhancing the effect of improving the strength using the reinforcing fibers, the reinforcing fibers preferably have an average diameter of 1 $\mu$m or more and 20 $\mu$m or less, and more preferably 4 $\mu$m or more and 10 $\mu$m or less.

In addition, the reinforcing fibers may be subjected to sizing treatment with a sizing agent.

The sizing agent is not particularly limited, but is preferably a modified polyolefin, and more preferably a modified polyolefin containing a carboxylic acid metal salt. The modified polyolefin is, for example, a modified polyolefin in which a carboxylic acid group, a carboxylic acid anhydride group, or a carboxylic acid ester group is grafted onto a polymer chain of an unmodified polyolefin, and a salt is formed between the functional group and a metal cation.

The above-described unmodified polyolefin is preferably an ethylene polymer with a content of 50 mol % or more of the constituent units derived from ethylene, or a propylene polymer with a content of 50 mol % or more of the constituent units derived from propylene. Examples of the above-described ethylene polymer include ethylene homopolymer and copolymer of ethylene and α-olefin with 3 to 10 carbon atoms. Examples of the above-described propylene polymer include propylene homopolymer, and copolymer of propylene and ethylene or α-olefin with 4 to 10 carbon atoms. The unmodified polyolefin is preferably homopolypropylene, homopolyethylene, an ethylene-propylene copolymer, a propylene-1-butene copolymer, or an ethylene-propylene-1-butene copolymer.

Further, the reinforcing fibers may be bundled to form a fiber bundle. Preferably, the number of single threads per bundle of bundled reinforcing fibers is preferably 100 or more and 100,000 or less, and more preferably 1,000 or more and 50,000 or less.

The material of the above-described matrix resin is not particularly limited, and may be a thermoplastic resin or a thermosetting resin. Examples of the thermoplastic resin include polyolefin resins including polypropylene resins, polyethylene resins, and the like, polyamide resins, polyester resins, polycarbonate resins, polyacetal resins, polyether ketone resins, polyether ether ketone resins, polysulfone resins, and the like. The polypropylene resins and polyamide resins are preferable among the above resins. In addition, from the viewpoint of enhancing the affinity with the reinforcing fibers subjected to the sizing treatment using the sizing agent, the above-described matrix resin may contain the modified polyolefin described above.

Other Embodiments

Note that each of the above-described embodiments represents one example of the present invention. The present invention is not limited to the above-described embodiments, and it is needless to say that various other various embodiments are also possible within the scope of the idea of the present invention.

For example, by way of example, each of the above-described embodiments has been described in which preceding reinforcing fibers 210 and new reinforcing fibers 220 are reinforcing fibers made of the same material, but preceding reinforcing fibers 210 and new reinforcing fibers 220 may be reinforcing fibers made of respective different materials.

Further, Embodiment 1 has been described in relation to an example in which each of the two holding sections includes the switching apparatus, but may also has a configuration in which three or more holding sections include respective switching apparatuses, and unite reinforcing fibers from these holding sections at a uniting section, or a configuration in which a single switching apparatus is disposed on a single holding section as in Embodiment 2 and the holding section does not include any uniting section.

Further, regarding Embodiment 1, the configuration in which the bonded body in which the preceding reinforcing fibers and the new reinforcing fibers are arranged in a planar shape without gaps has been described by way of example. However, the bonded body in which the preceding reinforcing fibers and the new reinforcing fibers are arranged in an overlapping manner as in Embodiment 2 may be formed.

Further, Embodiment 2 may have a configuration in which a plurality of holding sections may include switching apparatuses, respectively, and the reinforcing fibers from these holding sections may be united at a uniting section. At this time, the uniting section only needs to unite the reinforcing fibers such that bundles of the reinforcing fibers are disposed so as to be introduced into respective different die holes, by disposing the reinforcing fibers from the respective holding sections such that the reinforcing fibers are spaced from one another or overlap with one another.

Further, by way of example, each of the above embodiments has been described in which the upper and lower two resin films are fused to the reinforcing fibers, but a resin film may be fused to only one of the surfaces. Further, a plurality of resin films may be fused. The number of bonded bodies formed by fusing the resin film may be only one per switching occasion, or a plurality of bonded bodies may be formed by performing fusion of the resin film a plurality of times.

It is preferable that the material of the resin film be a thermoplastic resin from the viewpoint of facilitating melting and fusion. Examples of the thermoplastic resin include polyolefin resins including polypropylene resins and polyethylene resins, polyamide resins, polyester resins, polycarbonate resins, polyacetal resins, polyether ketone resins, polyether ether ketone resins, polysulfone resins, and the like. The polypropylene resins and polyamide resins are preferable among the above resins.

Further, by way of example, each of the above-described embodiments has been described in which the second resin in the form of a thin film is melted by heating and fused to the preceding reinforcing fibers and new reinforcing fibers, but the second resin may also be fused by irradiation with an electromagnetic wave (such as infrared rays), ultrasonic waves, and/or the like.

Further, the switching apparatus in each of the above-described embodiments may include a cooling section that cools and solidifies the second resin fused. The cooling section may be of a contact type or a non-contact type.

In addition, the reinforcing fibers fed out in each of the above-described embodiments may be used not only for producing the UD sheet or LFT, but also for producing a fiber-reinforced resin that is formed, for example, by chopping the reinforcing fibers and kneading it with a matrix resin, and in which the reinforcing fibers are randomly oriented and arranged.

The UD sheet or LFT produced by the above production apparatus can be used for automotive components including various modules such as instrument panels, door beams, undercovers, lamp housings, pedal housings, radiator supports, spare tire covers, front ends, and the like: electric and electronic components including notebook computers, mobile phones, digital still cameras, PDA, plasma displays, and the like; and home and office appliance components such as telephones, facsimiles, VTR, copiers, televisions, microwave ovens, audio equipment, toiletries, LaserDiscs (registered trademark), refrigerators, air conditioners, and the like. The UD sheet can also be used for pipes, pressure vessels, and the like by further forming the UD sheet.

Specific examples of applications of the UD sheet include primary structure materials including, for example, main wings, vertical and horizontal tails, secondary structure materials including, for example, ailerons, rudders and elevators, interior materials including, for example, seats and tables, component members for common air vehicles such as airplanes and helicopters, including for example, power plants, hydraulic cylinders and composite brakes, rocket component members including, for example, nozzle cones and motor cases, satellite component members including, for example, antennas, structures, solar panels, battery cases and telescopes, mechanical component members including, for example, frames, shafts, rollers, leaf springs, machine tool heads, robot arms, transport hands and synthetic fiber pots, component members for high-speed rotating bodies, including, for example, centrifuge rotors and uranium concentration cylinders, electronic and electric component members including, for example, parabola antennas, battery members, radars, acoustic speaker cones, computer components, printer components, personal computer housings and tablet housings, component members for automobiles and bikes, including, for example, frame components, semi-structural components, outer plate components, interior and exterior components, power plants, other equipment-hydraulic cylinders, brakes, battery cases, drive shafts, engine parts, spoilers, racing car bodies, crash cones, chairs, tablets, telephone covers, under covers, side covers, transmission covers, battery trays, rear steps, spare tire containers, bus body walls and truck body walls, vehicle component members including, for example, interior materials, floor panels, ceiling panels, linear motor car bodies, bullet train/railway car bodies, window wipers, dollies and seats, marine component members/fuselages including, for example, boats and ship hulls including, for example, yachts, cruisers and boats, and masts, ladders, propellers, hard sails, screws, military fuselages, submarine fuselages and deep sea exploration ships, component members for pressure vessels, including, for example, actuators, cylinders, bombs, hydrogen tanks, CNG tanks and oxygen tanks, scientific apparatus components/members including, for example, stirring blades, pipes, tanks, pit floors and plant piping, wind power generation component members including, for example, blades, skins, skeleton structures and de-icing systems, component members and goods for medical/nursing care equipment, including, for example, X-ray diagnostic apparatus components, wheelchairs, artificial bones, artificial legs/arms, axillary crutches, nursing care aids/robots (power assist suits), walking machines and nursing beds, civil engineering and infrastructure component members including, for example, CF composite cables, concrete strengthening members, guard rails, bridges, tunnel walls, hoods, cables, tension rods, strand rods and flexible pipes, component members for submarine oil field mining, including, for example, marine risers, flexible jumpers, flexible risers and drilling risers, sports and leisure goods including, for example, fishing rods, reels, golf clubs, tennis rackets, badminton rackets, ski plates, stocks, snowboards, ice hockey sticks, snowmobiles, bows, kendo bamboo swords, baseball bats, swim plungers, and sporting goods and sporting helmets for disabled peoples, bicycle components including, for example, frames, disc wheels, rims, handles and saddles, supplies including, for example, eyeglasses, bags, umbrellas and ballpoint pens, and other industrial component members and goods including, for example, plastic pallets, containers, logistics materials, resin molds, furniture, umbrellas, helmets, pipes, scaffolding boards, safety boots, protectors, fuel cell covers, drone blades, frame, jigs and jig frames.

The present application claims the benefit of priority based on Japanese Patent Application No. 2021-053388 filed on Mar. 26, 2021, the disclosure of which including the claims, specification, and drawings is incorporated herein by reference in its entirety.

INDUSTRIAL APPLICABILITY

A production apparatus for producing a fiber-reinforced resin in which reinforcing fibers are arranged to be oriented in a single direction according to the present invention is capable of connecting the preceding and following reinforcing fibers with a relatively simple configuration at the time of switching the reinforcing fibers. Therefore, the present disclosure is expected to facilitate continuous production of the fiber-reinforced resin to contribute to development in various fields using the fiber-reinforced resin, particularly the UD sheet or LFT.

REFERENCE SIGNS LIST

100, 300, 700 Production apparatus for producing fiber-reinforced resin
110 Fiber feeding section
112 Spindle
114 Creel
116, 116a, 116b Bobbin
120, 720 Guide path
122 Guide roll
124, 124a, 124b Feeder
126a, 126b Holding section
128 Uniting section
128a, 128b Roll
130a, 130b, 730 Switching apparatus
140 Accumulator
150, 750 Impregnation section
152, 752 Fiber-opening roller
154 Impregnation roller
156, 756 Extruder

158 Molten resin
160 Winding section
200, 200a, 200b Reinforcing fiber
210 Preceding reinforcing fiber
220 New reinforcing fiber
230 Resin film
240, 840 Bonded body
310 Thickness measurement section
320 Cutting section
330, 780 Collection section
754 Impregnation die
754a Die hole
770 Dividing section
782 Pelletizing cutter
784 Collection container
1310, 7310 Pressurization head
1320, 7320 Pedestal portion
1330, 1340, 7330, 7340 Cylinder
1360, 7360 Gripping section

The invention claimed is:

1. A production apparatus for producing a fiber-reinforced resin in which a reinforcing fiber is arranged to be oriented in a single direction, the production apparatus comprising:

an impregnation section that impregnates the reinforcing fiber with a melted first resin; and a switching apparatus that switches the reinforcing fiber from a preceding reinforcing fiber to a new reinforcing fiber at an upstream side of the impregnation section; wherein when switching the reinforcing fiber, the switching apparatus connects the new reinforcing fiber to the preceding reinforcing fiber by forming a bonded body in which the preceding reinforcing fiber and the new reinforcing fiber are bonded by fusing a melted second resin in a form of a thin film; and the production apparatus further comprises a removal section that removes, from the fiber-reinforced resin, a portion where the bonded body is formed, the fiber-reinforced resin being obtained by impregnation with the melted first resin at the impregnation section.

2. The production apparatus for producing the fiber-reinforced resin according to claim 1, wherein:

the switching apparatus includes a supply section that supplies the second resin such that the second resin comes into contact with both the preceding reinforcing fiber and the new reinforcing fiber, and a pressing section that presses the second resin while heating and melting the second resin, the second resin being in contact with the preceding reinforcing fiber and the new reinforcing fiber.

3. The production apparatus for producing the fiber-reinforced resin according to claim 1, wherein the second resin is a resin of a same type as the first resin.

4. The production apparatus for producing the fiber-reinforced resin according to claim 1, wherein the impregnation section supplies the melted first resin to the reinforcing fiber with the reinforcing fiber arranged in a planar shape, and impregnates the reinforcing fiber with the first resin.

5. The production apparatus for producing the fiber-reinforced resin according to claim 4, wherein the reinforcing fiber is one of a first plurality of reinforcing fibers and a second plurality of reinforcing fibers, the production apparatus further comprising:

a plurality of holding sections that, at respective different positions, hold the first and second pluralities of reinforcing fibers fed out; and a uniting section that receives the first and second pluralities of reinforcing fibers from the plurality of holding sections, unites the first and second pluralities of reinforcing fibers, and delivers the first and second pluralities of reinforcing fibers to the impregnation section, wherein the switching apparatus is one of a plurality of switching apparatuses, and the production apparatus further comprises the plurality of the switching apparatuses, which are disposed on the plurality of holding sections, respectively.

6. The production apparatus for producing the fiber-reinforced resin according to claim 5, wherein:

each of the plurality of holding sections holds a respective reinforcing fiber of the first and second pluralities of reinforcing fibers, and the uniting section disposes the first and second pluralities of reinforcing fibers alternately to unite the first and second pluralities f reinforcing fibers into a sheet shape, the first and second pluralities of reinforcing fibers being received from the plurality of holding sections, and an arrangement of the first and second pluralities of reinforcing fibers received from the plurality of holding sections is changed before and after switching of each respective reinforcing fiber by each of the plurality of the switching apparatuses.

7. The production apparatus for producing the fiber-reinforced resin according to claim 1, wherein the reinforcing fiber is one of a plurality of reinforcing fibers, each reinforcing fiber being in a form of a bundle, and the impregnation section comprises a plurality of die holes and supplies the melted first resin to the plurality of bundles, wherein each bundles passes through an inside of a respective one of the plurality of die holes, to impregnate each bundle with the first resin.

8. The production apparatus for producing the fiber-reinforced resin according to claim 7, wherein the bonded body connects the plurality of bundles, the production apparatus further comprising:

a dividing section that divides the bonded body into a plurality of individual bundles and introduces each individual bundle into the respective one of the plurality of die holes, each respective die hole being different for each individual bundle.

9. The production apparatus for producing the fiber-reinforced resin according to claim 1, wherein the reinforcing fiber is a carbon fiber.

10. The production apparatus for producing the fiber-reinforced resin according to claim 1, wherein the second resin is a thermoplastic resin.

11. A production method for producing a fiber-reinforced resin in which a reinforcing fiber is arranged to be oriented in a single direction, the production method comprising:

producing the fiber-reinforced resin while connecting a preceding reinforcing fiber to a new reinforcing fiber by using a production apparatus for producing the fiber-reinforced resin according to claim 1.

* * * * *